June 10, 1969   J. U. LEMKE   3,449,744
MAGNETIC DIGITAL TRANSDUCER
Filed Oct. 22, 1965

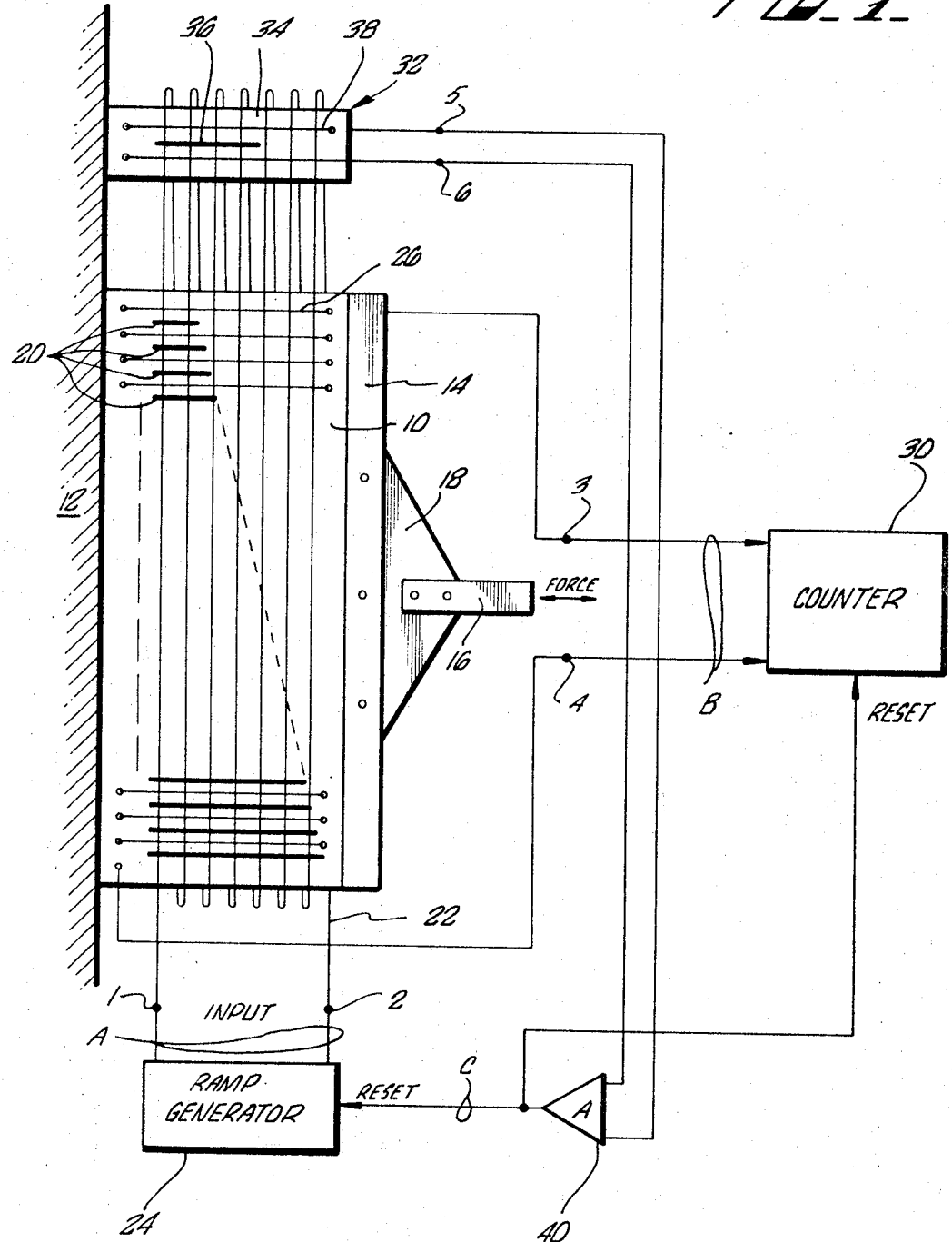

INVENTOR.
JAMES U. LEMKE
BY
Christie, Parker & Hale
ATTORNEYS

United States Patent Office 3,449,744
Patented June 10, 1969

3,449,744
MAGNETIC DIGITAL TRANSDUCER
James U. Lemke, Los Angeles, Calif., assignor to Bell & Howell Company, Chicago, Ill., a corporation of Illinois
Filed Oct. 22, 1965, Ser. No. 501,913
Int. Cl. G08c 9/04
U.S. Cl. 340—347                                9 Claims

ABSTRACT OF THE DISCLOSURE

There is described a transducer having a pluraliy of thin magnetic film each of different coercivity, subject to a magnetic field that increases up to a predetermined level. The number of layers in which the magnetization is reversed by the field is a measure of a force applied to the magnetic material in such a way to stress the magnetic films to change the coercivity of the layers.

---

This invention relates to a stress transducer and, more particularly, is concerned with a transducer for generating a digitized output signal in response to changes in applied stress.

The use of stress sensitive transducers is well known in such devices as vibrometers, pressure gauges and the like. In the typical strain gauge, for example, the resistivity of a conductor is varied by change in the stress applied to the conductor. The change is resistance is measured electrically to provide an indication of the applied stress. In such a device, the output is in analog form so that a separate analog-to-digital converter is required to digitize the output information. Furthermore, the change in resistance is a second order effect making the measurement more difficult and subject to error.

The present invention provides a stress transducer in which the output is inherently quantized in character. This is particularly important where the transducer is to be used for telemetering data to a remote point since it avoids the need for any analog-to-digital converter circuit. Furthermore, the stress is measured as a first order effect, giving the device higher reliability.

In brief, the invention comprises a rigid substrate on which are deposited a plurality of thin elongated films of magnetic material. In the preferred form of the invention, each of these strips is of slightly different length, giving rise to a different coercive force for each of the magnetic strips along the longitudinal or "easy" axis. A stress is applied to the magnetic films by deformation of the substrate in a direction parallel to the longitudinal axis of the strips. The applied stress changes the coercivity of the magnetic film along the easy axis. An input winding is wound on the substrate which generates a field along the longitudinal axis of each of the strips. A ramp voltage is applied to the coil so that as the voltage increases, the coercive force is successively exceeded in each of the strips starting with the shortest strip having the lowest coercivity. By permitting the voltage to increase to some predetermined level, only a fraction of the strips have their magnetization vector reversed. By changing the amount and direction of the stress applied to the substrate, the number of such strips in which the magnetization vector is reversed by the ramp voltage may be increased or decreased. An output winding senses the reversing of each of the strips, so that the number of output pulses on the output winding is a direct measure of the degree of stress applied to the substrate. The quantized output signal can be measured by counting the output pulses.

Figure 2A:
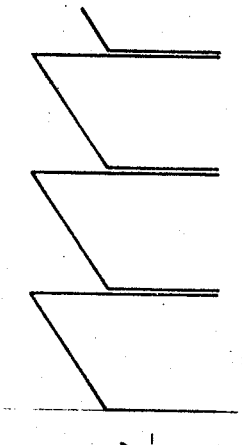
Figure 2B:
Figure 2C:
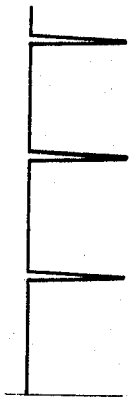
Figure 4C:
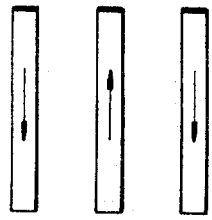
Figure 4B:
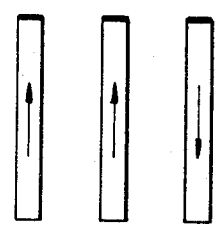
Figure 4A:
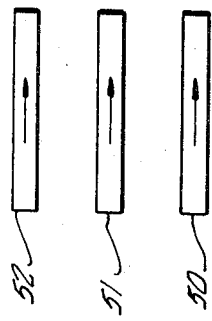
Figure 3:
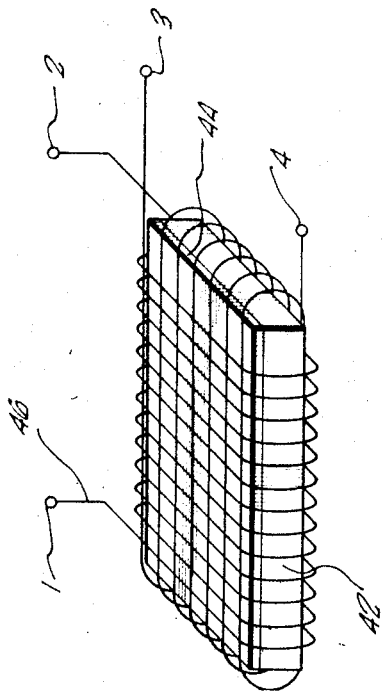

For a more complete understanding of the invention, reference should be made to the accompanying drawings wherein:

FIGURE 1 is a partially schematic diagram of one embodiment of the present invention;
FIGURES 2A-C are a series of waveforms used in explaining the operation of the circuit of FIGURE 1;
FIGURE 3 is an alternative embodiment of the transducer of the present invention; and
FIGURES 4A-C are a series of schematic representations of the alternative embodiment of FIGURE 3.

Referring to FIGURE 1 in detail, the numeral 10 indicates generally a substrate of glass, ceramic, Invar or other rigid stable material which is preferably mounted along one edge to a suitable rigid supporting structure indicated generally at 12. A rigid bar 14 is secured along the opposite edge of the substrate 10 and suitable means such as a rod 16 is secured to the rigid bar 14 through a bracket 18 and may be used to apply a force to the substrate in any suitable manner. The force applied to the rod 16 places the substrate 10 in tension or compression.

There is laid down on the surface of the substrate 10 a plurality of ferro-magnetic thin film strips 20. The deposited strips are vacuum deposited by conventional techniques from suitable materials, such as iron, cobalt, or nickel, having large shape anisotropy and magnetostriction constant. The strips are somewhat elongated along one axis, and are arranged with the longitudinal axis of the several strips being parallel to each other. It is well known in the magnetic film art that extremely thin film of ferro-magnetic material may exhibit very high coercivities with shape anisotropy control. For example, a long, thin, narrow spot of magnetic material deposited on a substrate has its "easy" magnetization vector along the longitudinal axis and exhibits almost perfectly square hysteresis. This shape for the strip precludes the possibility of a stable transverse magnetic state forming. Such a thin film strip retains its magnetization direction under a reverse external field until the coercive value is reached, at which time the magnetization vector is reversed. By using magnetic materials of pure iron, cobalt or nickel which have a high magnetoelastic energy velue, the coercive force will change as a first order effect under stress. Shape controlled anisotropy shows a four to one variation in coercive force for a change in aspect ratio of the thin film strip from 1½ to 1 up to 3 to 1. The aspect ratios of the thin film strips 20 are varied in incremental steps of as many as a hundred strips over this range of aspect ratio.

An input winding 22 having input terminals 1 and 2 is wound on the substrate 10 so as to provide a magnetic field aligned with the longitudinal axis of the magnetic thin film strips. Because of the graded variation in the coercivity of each of the strips due to the variation in their lengths, each thin film strip reverses its magnetization vector at a discrete level of the external magnetic field generated by the coil 22.

An input signal is applied to the coil 22 through the input terminals 1 and 2 by a ramp generator 24 which generates an increasing voltage across the input terminals, as shown by the waveform in FIGURE 2A. As the ramp function voltage increases, the magnetization vector of each magnetic film strip will be reversed in sequence. An output winding 26 is wound on the substrate 10 in orthogonal relationship to the input winding 22 so that there is no direct coupling between the input winding 22 and the output winding 26. However, whenever there is a reversal of the magnetization vector in one of the thin film strips, a voltage will be induced across the output winding 26, appearing across the output terminals 3 and 4.

From the description thus far, it will be apparent that the number of thin film strips in which the magnetization vector is reversed is determined by the peak voltage to which the output of the ramp generator 24 arises. Because of the magnetoelastic effect, as pointed out above, the coercive force of each magnetic film strip changes as a first order effect under stress. Therefore, the number of thin film strips in which the magnetization vector is reversed for a given peak amplitude of the ramp function voltage is directly related to the direction and degree of force applied to the rod 16. Therefore, by counting the number of output pulses produced by the output winding 26, a direct measure of the force applied to the rod 16 may be indicated.

To this end, a digital counter 30 is directly connected to the output terminals 3 and 4 of the output winding 26. The output count condition of the counter 30 at the end of one cycle of the ramp generator 24 can therefore be used as a measure of the magnitude of the stress applied through the rod 16.

To make the operation of the device insensitive to other parameters than stress, such as temperature, changes in the peak voltage of the ramp generator 24 and the like, a reference element 32 is provided in the circuit arrangement of FIGURE 1. The reference element includes a substrate 34 on which is deposited a single magnetic thin film strip 36. This thin film strip is designed to have a coercivity intermediate the range of coercivity provided by the thin film strips on the substrate 10. The substrate 34 is mounted adjacent the substrate 10 but is isolated from the stresses imposed on the substrate 10 by forces applied through the rod 16. The input winding 22 is arranged to pass around the substrate 34 so that the thin film strip 36 is subjected to the same external field as the strips 20 on the substrate 10. A separate output winding 34 is wound on the substrate 34 for sensing when the magnetization vector of the thin film strip 36 is reversed. The output winding 38 is connected to a pair of output terminals 5 and 6.

When the ramp generator 24 reaches a voltage level at which the magnetization of the reference thin film strip 36 is reversed, an output pulse is developed across the output terminals 5 and 6. This pulse is amplified by a suitable amplifier 40 and used to reset the ramp generator 24. The output of the amplifier 40 also acts to provide a pulse of opposite polarity across the input coil 22 for resetting the magnetization vector in all of the thin film strips back to their initial condition. The output waveform of the amplifier 40 is shown in FIGURE 2C. The reverse polarity pulse between cycles of the output of the ramp generator 24 is shown by the waveform of FIGURE 2A. FIGURE 2B shows the resulting output pulses as applied to the counter 30. The resetting pulse from the amplifier 40 is also used to reset the counter 30 at the end of each cycle of operation.

In operation, in the absence of a force applied to the rod 16, half of the thin film strips 20 have their magnetization vector reversed, for example, when the reference thin film strip 36 is also reversed, terminating the cycle of the operation. If a force is then applied to the rod 16, the number of thin film strips 20 on the substrate 10 that will reverse before the cycle is terminated by the output of the reference output winding 38 is lesser or greater by an amount determined by the magnitude and direction of the force applied. Thus the count established on the counter 30 at the end of each cycle will be a direct measure of the force applied to the substrate 10.

An alternative construction is shown in FIGURE 3 in which a substrate 42 has a plurality of magnetic thin films deposited thereon in successive layers, each layer being separated by a layer of non-magnetic material. Orthogonal input and output windings 46 and 48 are wound on the substrate 42. The device of FIGURE 3 operates substantially the same as the arrangement of FIGURE 1 in that with the magnetization vector in all of the magnetic thin film layers aligned in the same direction, the magnetization vector in the various layers reverse at different discrete levels. This is because with all the thin films in close proximity to each other, the interaction field tends to reduce the coercivity of the films so that they are in effect moved closer to the point at which the magnetization vector is reversed than in the case for a single film. However, as soon as the magnetic vector in one film is reversed by the applied field, the coercivity of the remaining layers is correspondingly increased. The coercivity of the layers immediately adjacent the layer in which the magnetization is reversed increases the most. Therefore, it has been found that as the magnetic field is increased, the magnetization in every other layer of thin magnetic film is reversed in succession by the gradually increasing external magnetic field. As a result, a succession of output pulses are generated in a manner similar to that described above in connection with FIGURE 1.

This effect may be better understood by reference to FIGURES 4A, B and C in which three thin film layers 50, 51 and 52 are represented. As shown in FIGURE 4A, the magnetization vector in all three layers is aligned in the same direction. It will be apparent that the interacting fields are in opposing relationship so that the coercivity in all of the layers is in effect reduced, i.e., the amount of external field required to reverse the magnetization in any one layer is lessened by the amount of the interacting field. In the arrangement of FIGURE 4B, the external field is shown as having reversed the magnetization vector in the layer 50. As a result, the coercivity in the layer 51 is increased since the interacting field between the layers 50 and 51 are no longer in opposition. As shown in FIGURE 4C, as the external magnetic field is increased, the magnetization vector in the layer 52 is reversed so that its external interacting field no longer opposes that of the layer 51. As a result of this action, the magnetization in alternate layers is successively reversed as the external applied magnetic field is increased.

From the above description, it will be recognized that the invention provides a transducer design which is inherently quantized in character. While the device has been described particularly in connection with its stress sensitivity, it will be apparent that other effects, such as temperature, which change the coercivity of the thin film stirps, may also be measured in quantized form by this technique.

What is claimed is:

1. A digitized transducer for measuring the magnitude of an input condition comprising a substrate, a plurality of thin elongated films of magnetic material deposited on the substrate, the films being arranged to exhibit different coercivities, means for generating a magnetic field aligned with the elongated axis of the films of magnetic material, means for increasing the field up to a predetermined level to bring several but not all of the films in succession to a magnetization level at which they reverse their magnetization vector, means for sensing the switching of the magnetization vector in each film, and means responsive to the input condition being measured for changing the coercivities of all the films simultaneously with changes in said condition, whereby the number of films reversed by said increasing field is a measure of the magnitude of the input condition.

2. Apparatus as defined in claim 1 wherein the thin films are arranged in parallel elongated strips of successively increasing length on the substrate.

3. Apparatus as defined in claim 1 wherein the thin films are arranged in successive layers separted by layers of non-magnetic material.

4. A digitized transducer comprising a first rigid substrate, a plurality of magnetic film strips deposited on the substrate with the longitudinal axes parallel to each other, a second rigid substrate, a magnetic film strip deposited on the second substrate, means for applying a stress to the films on the first substrate without stressing the film on the second substrate, input winding means having turns linking all the films on both substrates, the winding means in response to a current therethrough generating a magnetic field having flux lines extending along the longitudinal axis of each film stirp, means for generating and applying a ramp voltage to the input winding means, a first output winding wound on the first substrate and orthogonal to the input winding means for sensing switching of flux in any of the thin film strips, a second output winding wound on the second substrate and orthogonal to the input winding means, and means connected to the second output winding for resetting the ramp voltage generating means and pulsing the input winding means with a voltage of opposite polarity to the ramp voltage in response to siwtching of flux in the film strip of the second substrate.

5. Apparatus as defined in claim 4 wherein the thin films are arranged in parallel elongated strips of successively increasing length on the substrate.

6. Apparatus as defined in claim 4 wherein the thin films are arranged in successive layers separated by layers of non-magnetic material.

7. A digitized transducer comprising a rigid substrate, a plurality of magnetic film strips deposited on the substrate with the longitudinal axes parallel to each other, means for applying a stress to the films on the substrate, input winding means having turns linking all the films, the winding means in response to a current therethrough generating a magnetic field having flux lines extending along the longitudinal axis of each film strip, means for generating and applying a ramp voltage to the input winding means, a first output winding wound on the substrate and orthogonal to the input winding means for sensing switching of flux in any of the thin film strips, and means for resetting the ramp voltage generating means and pulsing the input winding means with a voltage of opposite polarity to the ramp voltage when the ramp voltage reaches a predetermined amplitude.

8. Apparatus as defined in claim 7 wherein the thin films are arranged in parallel elongated strips of successively increasing length on the substrate.

9. Apparatus as defined in claim 7 wherein the thin films are arranged in successive layers separated by layers of non-magnetic material.

References Cited

UNITED STATES PATENTS

| | | |
|---|---|---|
| 3,191,168 | 6/1965 | Barrett. |
| 3,230,515 | 1/1966 | Smaller. |
| 3,292,161 | 12/1966 | Broadbent. |
| 3,366,937 | 1/1968 | Fuller. |

MAYNARD R. WILBUR, *Primary Examiner.*

JEREMIAH GLASSMAN, *Assistant Examiner.*

U.S. Cl. X.R.

340—174